United States Patent
Kim et al.

(10) Patent No.: US 10,695,906 B2
(45) Date of Patent: Jun. 30, 2020

(54) MOVING ROBOT AND CONTROLLING METHOD

(71) Applicant: LG ELECTRONICS INC., Seoul (KR)

(72) Inventors: Jiwoong Kim, Seoul (KR); Hanmin Jo, Seoul (KR); Sunhee Cheon, Seoul (KR); Minwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 16/033,512

(22) Filed: Jul. 12, 2018

(65) Prior Publication Data

US 2019/0015984 A1 Jan. 17, 2019

(30) Foreign Application Priority Data

Jul. 12, 2017 (KR) .................. 10-2017-0088535

(51) Int. Cl.
  *B25J 9/16* (2006.01)
  *G05D 1/00* (2006.01)
  *B25J 9/00* (2006.01)

(52) U.S. Cl.
  CPC .......... *B25J 9/1666* (2013.01); *B25J 9/0003* (2013.01); *B25J 9/1661* (2013.01); *B25J 9/1679* (2013.01); *G05D 1/0044* (2013.01); *G05D 2201/0203* (2013.01)

(58) Field of Classification Search
  CPC ........ B25J 9/003; B25J 9/1661; B25J 9/1666; B25J 9/1679; G05D 1/0044; G05D 1/0203
  See application file for complete search history.

(56) References Cited

U.S. PATENT DOCUMENTS

| 7,706,917 B1* | 4/2010 | Chiappetta ........... G05D 1/0225 700/245 |
| 2009/0048727 A1 | 2/2009 | Hong et al. |
| 2010/0049364 A1 | 2/2010 | Landry et al. |
| 2012/0125363 A1* | 5/2012 | Kim ........................ A47L 9/28 134/6 |

(Continued)

FOREIGN PATENT DOCUMENTS

| JP | 2012-239897 | 12/2012 |
| JP | 2014-229300 | 12/2014 |

(Continued)

OTHER PUBLICATIONS

European Search Report dated Nov. 15, 2018 issued in Application No. 18182933.4.

(Continued)

*Primary Examiner* — Dale Moyer
(74) *Attorney, Agent, or Firm* — Ked & Associates, LLP

(57) ABSTRACT

A moving robot system includes a moving robot which travels in a cleaning area, generates a map of the cleaning area, moves based on the map, and sucks foreign substances; and a terminal which inputs a cleaning command to the moving robot, based on the map, wherein the moving robot determines that the moving robot is in an isolation state, when the moving robot is unable to move due to a surrounding obstacle while traveling in the cleaning area, and sets a virtual wall in an isolation position where isolation is occurred and avoids the isolation position during a next cleaning operation.

20 Claims, 12 Drawing Sheets

(a)

(b)

(56) References Cited

U.S. PATENT DOCUMENTS

| | | | |
|---|---|---|---|
| 2014/0207282 A1* | 7/2014 | Angle | G05B 15/02 |
| | | | 700/257 |
| 2014/0316636 A1 | 10/2014 | Hong et al. | |
| 2015/0250372 A1 | 9/2015 | T P et al. | |
| 2019/0061157 A1* | 2/2019 | Suvarna | B25J 9/1666 |
| 2019/0101926 A1* | 4/2019 | Takaoka | G05D 1/0238 |

FOREIGN PATENT DOCUMENTS

| | | |
|---|---|---|
| KR | 10-2010-0092326 | 3/2011 |
| KR | 10-1297255 | 8/2013 |
| KR | 10-2014-0126539 | 10/2014 |
| KR | 10-2015-0009048 | 1/2015 |
| KR | 10-2015-0014237 | 2/2015 |
| KR | 10-2014-0145256 | 5/2016 |
| KR | 10-2017-0077756 | 7/2017 |

OTHER PUBLICATIONS

Korean Office Action dated Dec. 18, 2018 issued in Application No. 10-2017-0088536.

Kim Han-Gyeol et al.: "Experience based Domestic Environment and User Adaptive Cleaning Algorithm of a Robot Cleaner," 2014 11$^{th}$ International Conference on Ubiquitous Robots and Ambient Intelligence (URAI), IEEE, Nov. 12, 2014 (Nov. 12, 2014), pp. 176-178, XP032744369, DOI: 10.1109/URAI.2014.7057525.

Tan Ning et al.: "Robot Ergonomics: A Case Study of Chair Design for Roomba," 2015 24$^{th}$ IEEE International Symposium on Robot and Human Interactive Communication (Ro-Man), IEEE, Aug. 31, 2015 (Aug. 31, 2015), pp. 246-251, XP032815402, DOI: 10.1109/Roman.2015.7333566.

European Search Report dated Nov. 21, 2018 issued in Application No. 18182949.0.

Korean Office Action dated Dec. 16, 2018 issued in Application No. 10-2017-0088535.

* cited by examiner

FIG. 1
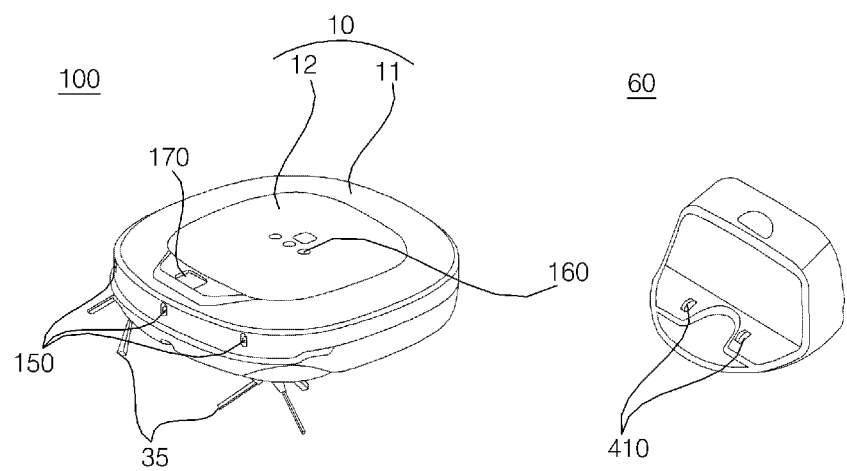
(a)
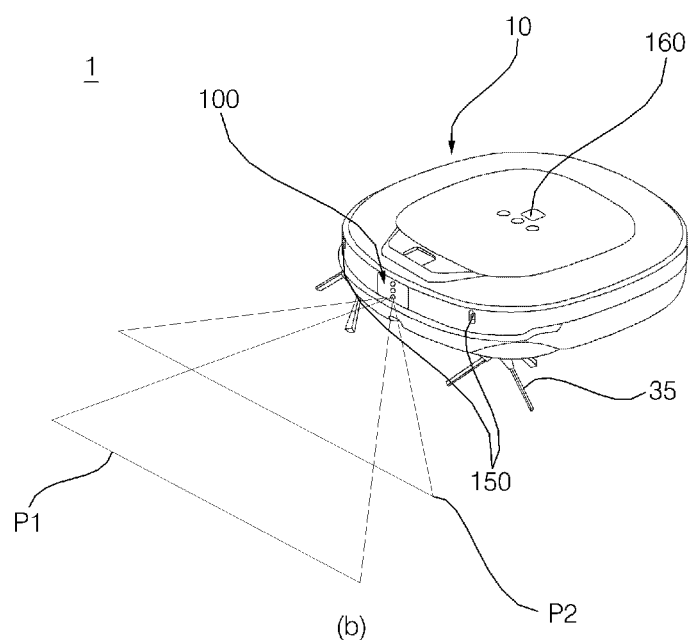
(b)

FIG. 2
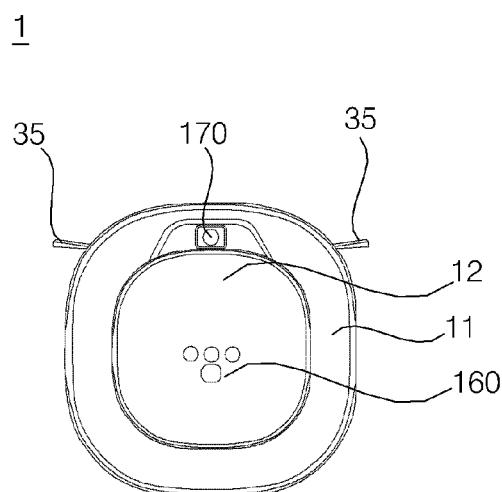
(a)
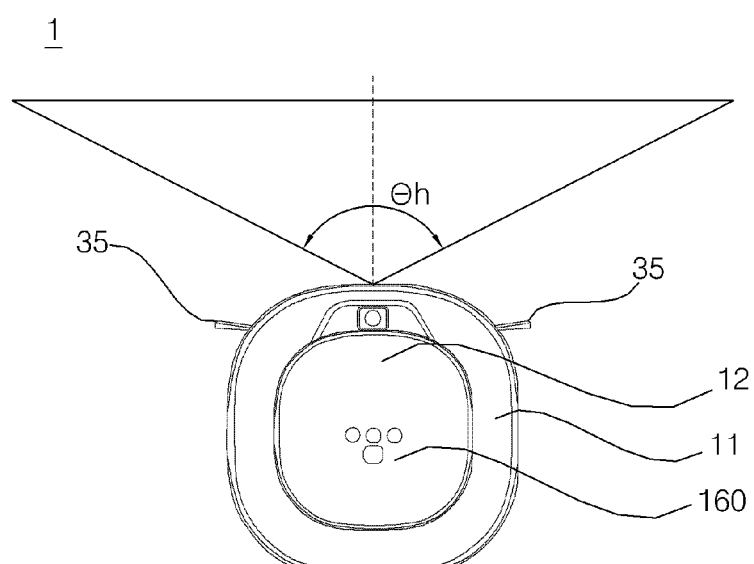
(b)

FIG. 3
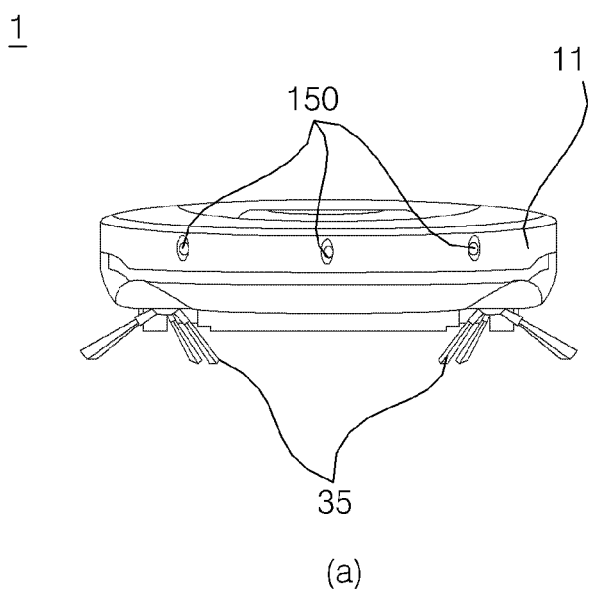
(a)
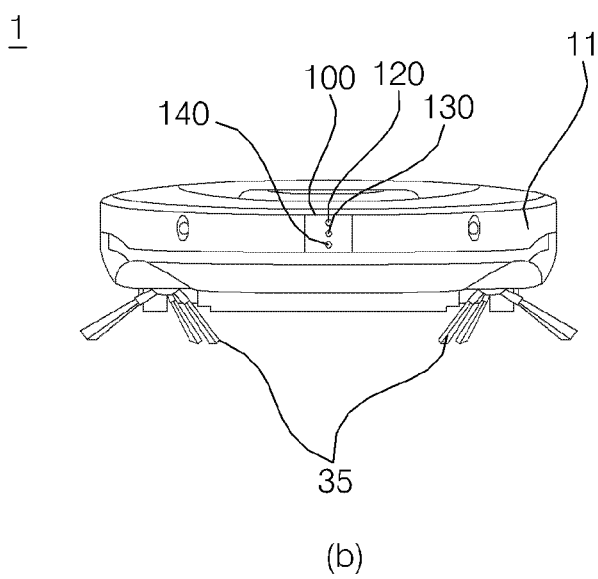
(b)

MOVING ROBOT AND CONTROLLING METHOD

CROSS-REFERENCE TO RELATED APPLICATION(S)

This application claims the priority benefit of Korean Patent Application No. 10-2017-0088535, filed in Korea on Jul. 12, 2017 in the Korean Intellectual Property Office, the disclosure of which is incorporated herein by reference.

BACKGROUND

1. Field

The present disclosure relates to moving robot system and a control method thereof, and more particularly, to a moving robot system for performing cleaning by traveling on a cleaning area and a control method thereof.

2. Background

Generally, a moving robot (or autonomous cleaner) is an apparatus that automatically performs cleaning without user's handling by suctioning foreign substances such as dust from a floor surface while traveling within an area to be cleaned. Such a moving robot senses the distance to an obstacle such as furniture, office supplies, and a wall installed in the cleaning area, and performs an obstacle avoidance operation.

However, the moving robot may enter under the bed or enter a narrow area, or be entangled with a power line and be isolated without being able to escape from a corresponding position. In such an isolated situation, the moving robot tries to escape. Occasionally, the moving robot may not be able to complete the cleaning because the battery is discharged due to the repeated escape attempt. Thus, a method that restricts the travel of the moving robot so as to prevent the occurrence of isolation state has been proposed.

Korean Patent Application No. 10-2014-0145256 (filed on Oct. 24, 2014) discloses a technology that performs avoidance travel for preventing restraint when a map is matched with a pattern after the map is generated according to a preset pattern. However, if a restraint occurs in an area where the pattern is not preset, there is a possibility that restraint may occur every time in the area. In addition, this technology adopts the method of storing a pattern, detecting this, and comparing with pattern, instead of the method of storing an area having a potential of constraint on a map. Therefore, there is a possibility that restraint may occur even in an area corresponding to the pattern if the detection is not accurate.

In addition, in order to restrict the movement of the moving robot, Korean Patent Application No. 10-2010-0092326 (filed on Sep. 20, 2010) sets up a virtual wall by interlocking the cleaning robot with an external apparatus, so that the operation of the cleaning robot can be restricted to prevent the cleaning robot from approaching a corresponding area. Since the setting of the virtual wall using the external apparatus depends entirely on a user, there is a problem that the actual environment in which the cleaning robot is isolated cannot be perfectly prevented. Since the external apparatus for setting a virtual wall requires a separate power, it should be disposed in consideration of the power supply to the external apparatus, so that there occurs a restriction due to the connection of a power line or the battery mounting or exchange. Further, there is a problem that user should determine an area in which the moving robot cannot travel and the user should install (dispose) and handle the external apparatus personally whenever performing cleaning.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein:

FIG. 1 is a perspective view illustrating a moving robot of a moving robot system according to an embodiment of the present disclosure;

FIG. 2 is a view illustrating a horizontal angle of view of the moving robot of FIG. 1;

FIG. 3 is a front view of the moving robot of FIG. 1;

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 4:
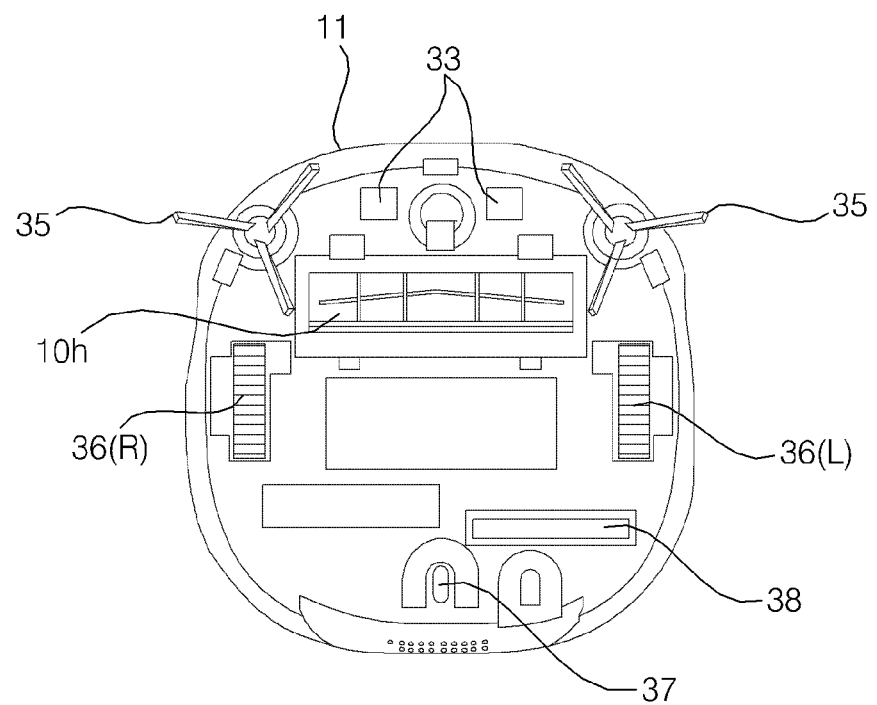
FIG. 4 is a bottom view of the moving robot of FIG. 1.

FIG. 1 is a perspective view illustrating a moving robot of a moving robot system according to an embodiment of the present disclosure, FIG. 2 is a view illustrating a horizontal angle of view of the moving robot of FIG. 1, FIG. 3 is a front view of the moving robot of FIG. 1, and FIG. 4 is a bottom view of the moving robot of FIG. 1. Referring to FIG. 1 to FIG. 4, a moving robot (or autonomous cleaner) 1 according to an embodiment of the present disclosure may include a main body 10 which moves along the floor of a cleaning area and sucks foreign substances such as dust on the floor, and at least one detection device which is disposed on the front surface of the main body 10 and detects an obstacle.

The main body 10 may include a casing 11 forming an outer shape and defining a space for accommodating parts constituting the main body 10 therein, a suction unit 34 disposed in the casing 11 and sucking foreign substances such as dust or trash, and a left wheel 36(L) and a right wheel 36(R) which are rotatably provided in the casing 11. As the left wheel 36(L) and the right wheel 36(R) rotate, the main body 10 may move along the floor of the cleaning area and, during this process, foreign substances may be sucked through the suction unit 34.

The suction unit 34 may include a suction fan (not shown) for generating a suction force and a suction port 10h for sucking the airflow generated by the rotation of the suction fan. The suction unit 34 may include a filter (not shown) for collecting foreign substances from the airflow sucked through the suction port 10h and a foreign substance collecting box (not shown) in which foreign substances collected by the filter are accumulated.

In addition, the main body 10 may include a travel drive unit for driving the left wheel 36(L) and the right wheel 36(R). The travel drive unit may include at least one drive motor. The at least one drive motor may include a left wheel drive motor for rotating the left wheel 36(L) and a right wheel drive motor for rotating the right wheel 36(R).

The left wheel drive motor and the right wheel drive motor may be controlled independently by a travel controller of a controller, so that the main body 10 can go forward, backward, or turn round. For example, when the main body 10 travels straight, the left wheel drive motor and the right wheel drive motor may be rotated in the same direction. However, when the left wheel drive motor and the right wheel drive motor are rotated at a different speed or rotated in the opposite direction, the travel direction of the main body 10 can be changed. At least one auxiliary wheel 37 for stable support of the main body 10 may be further provided.

A plurality of brushes 35, which are located on the front side of the bottom surface of the casing 11 and have a plurality of radially extending feathering, may be further provided. The dusts may be removed from the floor of the cleaning area by the rotation of the brushes 35, so that the dusts separated from the floor may be sucked through the suction port 10h and gathered in the collecting box.

A control panel including an operation unit (or user interface) 160 for receiving various commands for controlling the moving robot 1 from a user may be provided on the upper surface of the casing 11.

The detection device may include, as shown in section (a) of FIG. 1, a sensor unit (or sensor) 150 for sensing an obstacle by using a plurality of sensors, and an image acquisition unit (also referred to as a camera or image sensor) 140, 170 for photographing an image.

In addition, as shown in section (b) of FIG. 1, the detection device may include an obstacle sensing unit (also referred to as an obstacle detector or obstacle sensor) 100 disposed on the front surface of the main body 10 for sensing an obstacle by irradiating a light pattern with the sensed image. The obstacle detection unit 100 may include an image acquisition unit (also referred to as a camera or an image sensor) 140, and the sensing unit may include both an obstacle detection unit 100 and a sensor unit 150.

The image acquisition unit 140 may be provided, as shown in section (a) of FIG. 2, to face the ceiling or may be provided, as shown in section (b) of FIG. 3, to face the front.

Optionally, any one image acquisition unit 140 may be provided or both of the image acquisition units 140 facing the front and the ceiling may be provided.

An obstacle detection unit 100 may be disposed on the front surface of the main body 10. The obstacle detection unit 100 may be fixed to the front surface of the casing 11, and may include a first pattern irradiation unit 120, a second pattern irradiation unit 130, and the image acquisition unit 140. At this time, basically, as shown in the drawing, the image acquisition unit 140 may be installed below the pattern irradiation unit 120, 130, but may be optionally disposed between the first and second pattern irradiation units 120, 130.

In addition, as described above, a second image acquisition unit (170) may be further provided at an upper end or upper surface of the main body. The second image acquisition unit may capture an image from an upper end portion of the main body, i.e., an image of a ceiling.

The main body 10 may be provided with a rechargeable battery 38. A charging terminal 33 of the battery 38 may be connected to a commercial power source (e.g., a power outlet in a home), or the main body 10 may be docked to a separate charging stand 60 connected to the commercial power source, so that the charging terminal 33 can be electrically connected to the commercial power source, and the battery 38 can be charged. Electric components constituting the moving robot 1 may be supplied with power from the battery 38. Therefore, in a state where the battery 38 is charged. the moving robot 1 can perform an automatic travelling while being electrically disconnected from the commercial power source.

Figure 5:
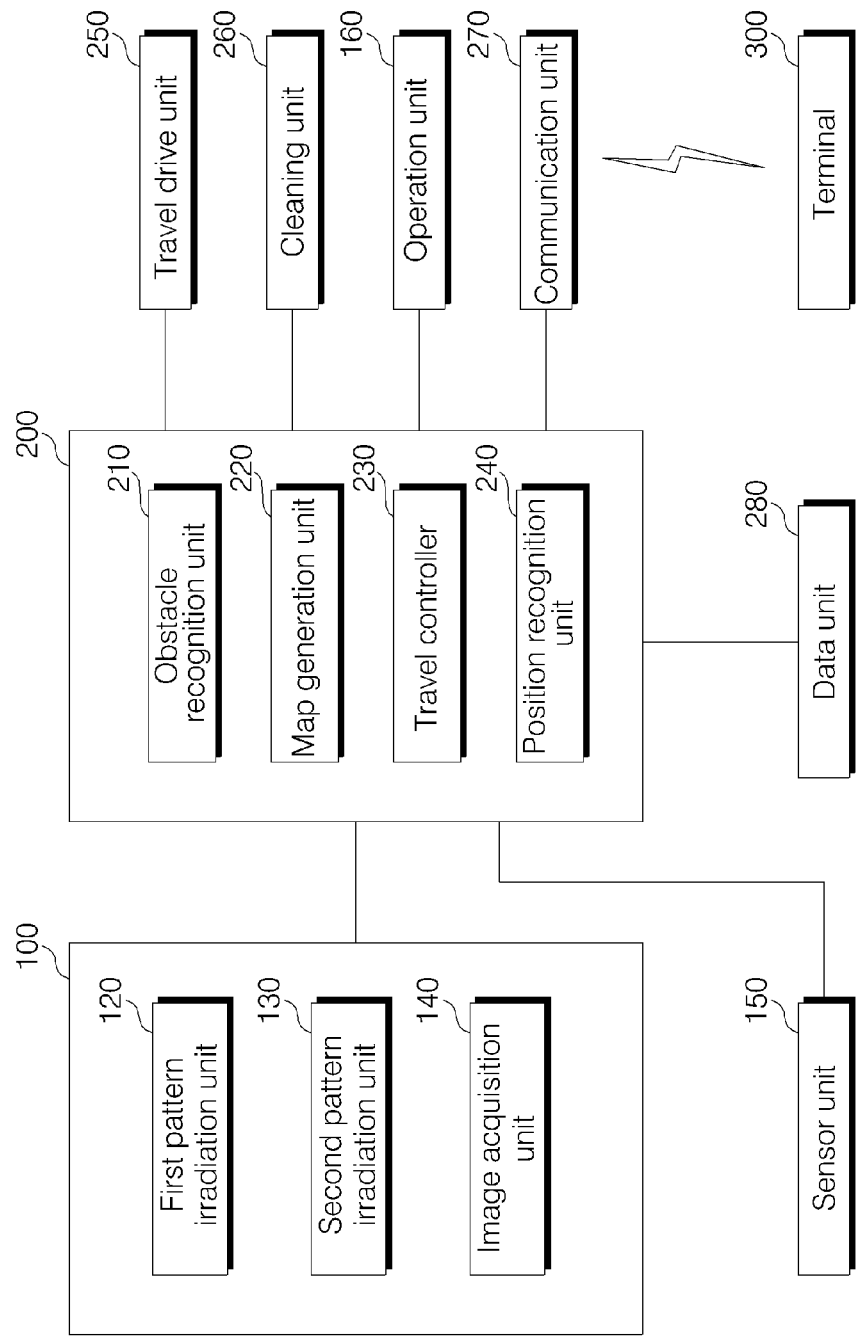
FIG. 5 is a block diagram illustrating main parts of a moving robot according to an embodiment of the present disclosure.

FIG. 5 is a block diagram illustrating main parts of a moving robot according to an embodiment of the present disclosure. As shown in FIG. 5, the moving robot 1 may include a travel drive unit (or drive motor) 250, a cleaning unit (or cleaning head) 260, a data unit (or memory) 280, an obstacle detection unit (or obstacle detection sensor) 100, a sensor unit (or sensor) 150, a communication unit (or communication interface or antenna) 270, an operation unit (or user interface) 160, and a controller 200 for controlling overall operation. The controller may be implemented by one or more microprocessors, and may be implemented by a hardware apparatus.

The operation unit 160 may include at least one input device such as button, switch, touch pad, to receive a user command. The operation unit may be provided at the upper end of the main body 10, as described above.

The data unit 280 may store an obstacle detection signal input from the obstacle detection unit 100 or the sensor unit 150, may store reference data that is necessary for an obstacle recognition unit 210 to determine an obstacle, and may store obstacle information related to detected obstacle. In addition, the data unit 280 may store control data for controlling the operation of the moving robot and data according to a cleaning mode of the moving robot, and store a map, generated by a map generator, including obstacle information. The data unit 280 may store a basic map, a cleaning map, a user map, and a guide map. The obstacle detection signal may include a detection signal such as an ultrasonic wave/laser by the sensor unit, and an acquisition image of the image acquisition unit. The data unit 280 may store data that can be read by a microprocessor and may include a hard disk drive (HDD), a solid state disk (SSD), a silicon disk drive (SDD), ROM, RAM, CD-ROM, a magnetic tape, a floppy disk, and an optical data storage device.

The communication unit 270 may communicate with a terminal (not shown) in a wireless communication manner.

In addition, the communication unit 270 may be connected to the Internet network through an in-home network, and may communicate with an external server or a terminal controlling the moving robot. The communication unit 270 may transmit the generated map to the terminal, receive a cleaning command from the terminal, and transmit data related to the operation state of the moving robot and the cleaning state to the terminal. The communication unit 270 may include not only a short-distance wireless communication module such as ZigBee, Bluetooth but also a communication module such as Wi-Fi, WiBro to transmit and receive data.

Meanwhile, the terminal may be an apparatus in which a communication module is mounted to achieve a network connection and a program for controlling the moving robot or an application for controlling the moving robot is installed, and may be a computer, a laptop, a smart phone, a PDA, a tablet PC, or the like. In addition, the terminal may be a wearable device such as a smart watch.

The travel drive unit 250 may include at least one drive motor and allow the moving robot to travel according to a control command of a travel controller 230. As described above, the travel drive unit 250 may include the left wheel drive motor for rotating the left wheel 36(L) and the right wheel drive motor for rotating the right wheel 36(R).

The cleaning unit 260 may operate a brush to form a state for easily sucking dust or foreign substances around the moving robot, and operate a suction device to suck the dust or foreign substances. The cleaning unit 260 may control the operation of the suction fan included in the suction unit 34 that sucks foreign substances such as dust or trash so that the dust may be introduced into the foreign substance collecting box through the suction port.

The obstacle detection unit 100 may include the first pattern irradiation unit 120, the second pattern irradiation unit 130, and the image acquisition unit 140. The sensor unit 150 may include a plurality of sensors to assist the detection of failure. The sensor unit 150 may sense an obstacle in front of the main body 10, i.e., in the travel direction, by using at least one of a laser, an ultrasonic wave, and an infrared ray. When the transmitted signal is reflected and inputted, the sensor unit 150 may input information on the presence of an obstacle or a distance to the obstacle to the controller 200 as an obstacle detection signal.

In addition, the sensor unit 150 may include at least one tilt sensor to detect the tilt of the main body. The tilt sensor may calculate the tilted direction and angle, when being tilted to the front, rear, left, and right directions of the main body. The tilt sensor may be a tilt sensor, an acceleration sensor, or the like. In the case of the acceleration sensor, any one of gyro type, inertial type, and silicon semiconductor type may be used.

As described above, in the obstacle detection unit 100, the first pattern irradiation unit 120, the second pattern irradiation unit 130, and the image acquisition unit 140 may be installed in the front surface of the main body 10 to irradiate lights of first and second patterns (P1, P2) to the front of the moving robot 10, and may acquire an image by photographing a light of the irradiated pattern. The obstacle detection unit 100 may input the acquisition image to the controller 200 as an obstacle detection signal.

The first and second pattern irradiation units 120 and 130 of the obstacle detection unit 100 may include a light source, and an optical pattern projection element (OPPE) that generates a certain pattern by transmitting the light irradiated from the light source. The light source may be a laser diode (LD), a light emitting diode (LED), or the like. Laser light may be superior to other light sources in terms of monochromaticity, straightness, and connection characteristics, thereby achieving a precise distance measurement. In particular, the infrared light or visible light may incur variation significantly in the accuracy of the distance measurement depending on a factor such as the color and the material of the object. Accordingly, a laser diode is preferable as a light source. The optical pattern projection element (OPPE) may include a lens, and a diffractive optical element (DOE). Various patterns of light may be irradiated according to the configuration of the OPPE included in each of the pattern irradiation units 120 and 130.

The first pattern irradiation unit 120 may irradiate a light of the first pattern P1 (hereinafter, referred to as a first pattern light) toward the front lower side of the main body 10. Therefore, the first pattern light P1 may be incident on the floor of the cleaning area.

The first pattern light P1 may be formed in the form of a horizontal line Ph. In addition, it is possible that the first pattern light P1 is formed in the form of a cross pattern in which the horizontal line Ph and a vertical line Pv intersect each other.

The first pattern irradiation unit 120, the second pattern irradiation unit 130, and the image acquisition unit 140 may be vertically arranged in a line. The image acquisition unit 140 may be disposed below the first pattern irradiation unit 120 and the second pattern irradiation unit 130. However, the present disclosure is not limited thereto, and the image acquisition unit 140 may be disposed above the first pattern irradiation unit 120 and the second pattern irradiation unit 130.

In an embodiment, the first pattern irradiation unit 120 may be located in the upper side of the obstacle detection unit 100 and may irradiate the first pattern light P1 downwardly toward the front to detect an obstacle located below the first pattern irradiation unit 120. The second pattern irradiation unit 130 may be located below the first pattern irradiation unit 120 and may irradiate a light of the second pattern (P2, hereinafter, referred to as a second pattern light) upwardly toward the front. Accordingly, the second pattern light P2 may be emitted to a wall or an obstacle or a certain portion of the obstacle located at least higher than the second pattern irradiation unit 130 from the floor of the cleaning area.

The second pattern light P2 may have a pattern different from that of the first pattern light P1, and preferably may include a horizontal line. Here, the horizontal line is not necessarily a continuous line segment, but may be a dotted line.

Meanwhile, in FIG. 2, the irradiation angle θh may indicate a horizontal irradiation angle of the first pattern light P1 irradiated from the first pattern irradiation unit 120, and represent an angle formed between both ends of the horizontal line Ph and the first pattern irradiation unit 120. It is preferable that the irradiation angle is set in the range of 130 degrees to 140 degrees, but is not limited thereto. The dotted line shown in FIG. 2 may be directed toward the front of the moving robot 1, and the first pattern light P1 may be configured to be symmetrical with respect to the dotted line.

Similarly to the first pattern irradiation unit 120, the horizontal irradiation angle of the second pattern irradiation unit 130 may be defined, preferably, in the range of 130 to 140 degrees. According to an embodiment, the second pattern irradiation unit 130 may irradiate the pattern light P2 at the same horizontal irradiation angle as the first pattern irradiation unit 120. In this case, the second pattern light P2 may also be formed symmetrically with respect to the dotted line shown in FIG. 2.

The image acquisition unit 140 may acquire an image in front of the main body 10. Particularly, the pattern light P1 and P2 may appear in the image acquired by the image acquisition unit 140 (hereinafter, referred to as an acquisition image). Hereinafter, the image of the pattern light P1 and P2 displayed in the acquisition image may be referred to as a light pattern. Since this is substantially an actual image, formed in an image sensor, of the pattern light P1 and P2 incident on an space, the same reference numeral as the pattern lights P1 and P2 may be assigned. Thus, the images corresponding to the first pattern light P and the second pattern light P2 respectively may be referred to as a first light pattern P1 and a second light pattern P2.

The image acquisition unit 140 may include a digital camera that converts an image of an object into an electrical signal and then converts into a digital signal to store the digital signal in a memory device (e.g., data unit 280). The digital camera may include an image sensor (not shown) and an image processing unit (not shown).

The image sensor may be an apparatus for converting an optical image into an electrical signal. The image sensor may be composed of a chip on which a plurality of photo diodes are integrated, and the photodiode may be a pixel. Charges may be accumulated in the respective pixels by the image, formed in the chip, of the light passing through a lens. The charges accumulated in the pixel may be converted into an electrical signal (e.g., a voltage). A charge coupled device (CCD) and a complementary metal oxide semiconductor (CMOS) are well known as the image sensor.

The image processing unit (or image processor) may generate a digital image based on an analog signal output from the image sensor. The image processing unit may include an AD converter for converting an analog signal into a digital signal, a buffer memory for temporarily storing digital data according to the digital signal output from the AD converter, and a digital signal processor (DSP) for processing the data stored in the buffer memory and configuring a digital image.

The controller 200 may include the obstacle recognition unit 210, a map generation unit 220, the travel controller 230, and a position recognition unit 240. The obstacle recognition unit 210 may determine an obstacle through the acquisition image input from the obstacle detection unit 100. The travel controller 230 may control the travel drive unit 250 to change the moving direction or the traveling route in response to obstacle information to pass the obstacle or to avoid the obstacle.

The travel controller 230 may control the travel drive unit 250 to independently control the operation of the left and right wheel drive motors so that the main body 10 can travel straight or turn. The obstacle recognition unit 210 may store an obstacle detection signal input from the sensor unit 150 or the obstacle detection unit 100 in the data unit 280, and analyze the obstacle detection signal to determine an obstacle.

The obstacle recognition unit 210 may determine whether obstacle exists ahead based on the signal of the sensor unit, and analyze the acquisition image to determine the position, size, and shape of the obstacle. The obstacle recognition unit 210 may analyze the acquisition image and extract a pattern. The obstacle recognition unit 210 may extract a light pattern which is generated when the light of the pattern irradiated from the first pattern irradiation unit or the second pattern irradiation unit is irradiated on the floor or the obstacle, and determine an obstacle based on the extracted light pattern.

The obstacle recognition unit 210 may detect the light pattern P1 and P2 from the image (acquisition image) acquired by the image acquisition unit 140. The obstacle recognition unit 210 may detect feature such as point, line, surface, and the like with respect to certain pixels constituting the acquisition image, and detect the light pattern P1 and P2 or the point, line, surface, and the like that constitute the pattern P1 and P2 based on the detected feature.

The obstacle recognition unit 210 may extract lines constituted by successive pixels brighter than the surrounding area, and extract a horizontal line Ph constituting the first light pattern P1 and a horizontal line constituting the second light pattern P2. However, the present disclosure is not limited thereto. Various techniques for extracting a desired pattern from a digital image are already known, and the obstacle recognition unit 210 may extract the first light pattern P1 and the second light pattern P2 by using known techniques.

In addition, the obstacle recognition unit 210 may determine the presence of an obstacle based on the detected pattern, and determine the shape of the obstacle. The obstacle recognition unit 210 may determine an obstacle through the first light pattern and the second light pattern, and calculate the distance to the obstacle. In addition, the obstacle recognition unit 210 may determine the size (height) and the shape of the obstacle through the shape of the first light pattern and the second light pattern, and the change of the light pattern displayed when approaching the obstacle.

The obstacle recognition unit 210 may determine an obstacle based on the distance to a reference position with respect to the first and second patterns. When the first light pattern P1 appears in a position lower than the reference position, the obstacle recognition unit 210 may determine that a downward ramp exists. When the first light pattern P1 disappears, the obstacle recognition unit 210 may determine that there exists a cliff. In addition, when the second light pattern appears, the obstacle recognition unit 210 may determine a forward obstacle or an upper obstacle.

The obstacle recognition unit 210 may determine whether the main body is tilted, based on tilt information input from the tilt sensor of the sensor unit 150. When the main body is tilted, the obstacle recognition unit 210 may compensate the tilt with respect to the position of the light pattern of the acquisition image.

The travel controller 230 may control the travel drive unit 250 to travel in a specified area of the cleaning area and perform cleaning, and control the cleaning unit 260 to perform cleaning by sucking dust while traveling. In response to the obstacle recognized by the obstacle recognition unit 210, the travel controller 230 may determine whether it is possible to travel or to enter, and control the travel drive unit 250 to set a travel route so as to approach the obstacle and travel, pass the obstacle, or avoid the obstacle.

The map generation unit 220 may generate a map of the cleaning area, based on the information of the obstacle determined by the obstacle recognition unit 210. The map generation unit 220 may generate a map for the cleaning area based on the obstacle information while traveling the cleaning area, in the initial operation or when the map for the cleaning area is not stored. In addition, the map generation unit 220 may update a pre-generated map, based on the obstacle information acquired during the traveling.

The map generation unit 220 may generate a basic map based on the information acquired from the obstacle recognition unit 210 during the traveling, and generate a cleaning map by dividing the area from the basic map. In addition, the map generation unit 220 may readjust the area for the cleaning map and set an attribute for the area to generate a user map and a guide map.

The basic map may be a map in which the shape of the cleaning area acquired through traveling is displayed as an outline, and the cleaning map may be a map in which the area is divided in the basic map. The basic map and the cleaning map may include the movable area of the moving robot and the obstacle information. The user map may be a map which simplifies the area of the cleaning map and readjust and process the shape of the outline, and is added with visual effects. The guide map may be a map in which the cleaning map and the user map are superimposed. Since the cleaning map is displayed in the guide map, a cleaning command may be inputted based on the area where the moving robot can actually travel.

After generating the basic map, the map generation unit 220 may generate a map by including a connection path for dividing the cleaning area into a plurality of areas and connecting the plurality of areas, and including information on an obstacle in the respective areas. The map generation unit 220 may set a representative area by dividing a small area so as to divide an area on a map, and set the divided small area as a separate detail area to be merged into the representative area, thereby generating a map in which the area is divided.

The map generation unit 220 may process the shape of the area for each of the divided areas. The map generation unit 220 may set an attribute for the divided area, and process the shape of the area according to the attribute for each area.

The map generation unit 220 may first determine a main area based on the number of contact points with other areas, in each of the divided areas. The main area may be, basically, a living room, but the main area may be changed to any one of a plurality of rooms in some cases. The map generation unit 220 may set the attribute for the remaining area based on the main area. For example, the map generation unit 220 may set an area of a certain size or more disposed based on the living room, which is a main area, as a room, and set the other areas as other area.

The map generation unit 220 may process the shape of the area so that each area may have a specific shape according to a criterion according to the attribute of the area. For example, the map generation unit 220 may process the shape of an area based on a typical family room type, e.g., a square. In addition, the map generation unit 220 may process the shape of an area by expanding the shape of the area based on the outermost cell of the basic map, and deleting or reducing the area with respect to the area that cannot be approached due to an obstacle.

In addition, depending on the size of the obstacle, in the basic map, the map generation unit 220 may display an obstacle having a certain size or larger on the map, and delete a corresponding cell of the obstacle less than a certain size to prevent the obstacle from being displayed. For example, the map generating unit may display furniture such as a chair, a sofa, or the like having a certain size or more on a map, and delete a temporary obstacle, e.g., a small toy from the map. The map generation unit 220 may store the position of a charging stand together with a map when generating the map.

The map generation unit 220 may add an obstacle to the map based on the obstacle information input from the obstacle recognition unit 21, with respect to the detected obstacle, after generating the map. The map generation unit 220 may add an obstacle to the map when a specific obstacle is repeatedly detected at a fixed position, and ignore the obstacle when the obstacle is temporarily detected. The map generation unit 220 may generate both the user map, which is a map of the processed form, and the guide map, which is displayed by superimposing the user map and the cleaning map.

When a virtual wall is set by a terminal 300, the map generation unit 220 may set the position of the virtual wall to the cleaning map based on the data of the virtual wall received through the communication unit, and calculate the coordinate of the virtual wall corresponding to the cleaning area. The map generation unit 220 may register the virtual wall in the cleaning map as an obstacle.

The map generation unit 220 may expand the virtual wall set by the terminal and register it as an obstacle. During the traveling, the map generation unit 220 may expand and set the set virtual wall to a wider range so that the main body 10 may not be in contact with or may not intrude into the virtual wall, preventing the main body 10 from contacting the virtual wall.

When the current position of the main body 10 cannot be determined by the position recognition unit 240, the map generation unit 220 may generate a new map for the cleaning area. The map generation unit 220 may determine that the main body 10 has moved to a new area and initialize a preset virtual wall.

The moving robot may perform the cleaning based on the cleaning map, and transmit the user map and the guide map to the terminal. The terminal 300 may store both the guide map and the user map to display on the screen, and output one of them according to the setting. When a cleaning command based on the user map or the guide map is input from the terminal 300, the moving robot 1 may travel based on the cleaning map and clean a specified area.

The position recognition unit 240 may determine the current position of the main body 10 based on the map (cleaning map, guide map, or user map) stored in the data unit. When the cleaning command is input, the position recognition unit 240 may determine whether the position on the map is coincident with the current position of the main body 10. When the current position is not coincident with the position on the map or when the current position cannot be determined, the position recognition unit 240 may recognize the current position and restore the current position of the moving robot 1. When the current position is restored, the travel controller 230 may control the travel drive unit to move to a specified area based on the current position. The cleaning command may be input from a remote controller (not shown), the operation unit 160, or the terminal 300.

When the current position is not coincident with the position on the map or when the current position cannot be determined, the position recognition unit 240 may analyze the acquisition image input from the image acquisition unit 140 and estimate the current position based on the map. The position recognition unit 240 may process the acquisition image acquired at each position during the map generation by the map generation unit 220, and recognize the whole area position of the main body in association with the map.

The position recognition unit 240 may determine the current position of the main body by comparing the map with the acquisition image of each position on the map by using the acquisition image of the image acquisition unit 140, so that the current position can be estimated and recognized even when the position of the main body is suddenly changed.

The position recognition unit 240 may analyze various features included in the acquisition image, such as ceiling lights, edge, corner, blob, ridge, or the like. The acquisition image may be input from the image acquisition unit or a second image acquisition unit provided at an upper end of the main body.

The position recognition unit 240 may detect the feature from each of the acquisition images. Various methods for detecting features from an image in the field of Computer Vision are well known. Several feature detectors suitable for detecting these features are known, such as Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR and Gray-level blobs detector, and the like.

The position recognition unit 240 may calculate a descriptor based on each feature point. The position recognition unit 240 may convert the feature point into a descriptor by using a Scale Invariant Feature Transform (SIFT) technique for feature detection. The descriptor may be denoted by an n-dimensional vector. SIFT may detect an unchanging feature with respect to the scale, rotation, and brightness change of a subject of photograph. Even if the same area is photographed with a different posture of the moving robot 1, the unchanging (Rotation-invariant) feature can be detected. Obviously, the present disclosure is not limited thereto, and various other techniques (for example, HOG: Histogram of Oriented Gradient, Haar feature, Fems, Local Binary Pattern (LBP), and Modified Census Transform (MCT)) may be applied.

The position recognition unit 240 may classify at least one descriptor for each acquisition image into a plurality of groups according to a certain sub-classification rule, based on descriptor information acquired through the acquisition image of each position, and may convert the descriptors included in the same group into sub-representative descriptors respectively according to a certain sub-representative rule. For another example, it is also possible to classify all descriptors gathered from acquisition images in a certain area, such as a room, into a plurality of groups according to a certain sub-classification rule, and may convert the descriptors included in the same group into sub-representative descriptors respectively according to a certain sub-representative rule.

The position recognition unit 240 may obtain the feature distribution of each position through such a process. Each position feature distribution may be represented by a histogram or an n-dimensional vector. As another example, the position recognition unit 240 may estimate an unknown current position based on the descriptor calculated from each feature point, without going through a certain sub-classification rule and a certain sub-representative rule.

In addition, when the current position of the moving robot 1 is in an unknown state due to a position leap or the like, the position recognition unit 240 may estimate the current position based on data such as a pre-stored descriptor, a sub-representative descriptor, or the like.

The position recognition unit 240 may acquire the acquisition image through the image acquisition unit 140 at an unknown current position, and detect features from the acquisition image, when various features, such as lights located on the ceiling, an edge, a corner, a blob, a ridge, are determined through the image.

The position recognition unit 240 may convert into position information (e.g., feature distribution of each position) to be compared in accordance with a certain sub-transformation rule and comparable information (sub-recognition feature distribution), based on at least one recognition descriptor information acquired through the acquisition image of an unknown current position. According to a certain sub-comparison rule, each position feature distribution may be compared with each recognition feature distribution to calculate each similarity. The similarity (probability) may be calculated according to the above mentioned position corresponding to each position, and the position where the greatest probability is calculated may be determined as the current position.

When the map is updated by the map generation unit 220 during the traveling, the controller 200 may transmit the updated information to the terminal 300 through the communication unit so that the map stored in the terminal and the moving robot 1 can be the same. Accordingly, as the map stored in the terminal 300 and the moving robot 1 is maintained to be the same, the moving robot 1 may clean the specified area in response to the cleaning command from the terminal. In addition, the terminal may display the current position of the moving robot on the map.

When the cleaning command is inputted, the travel controller 230 may control the travel drive unit to move to the specified area of the cleaning area, and operate the cleaning unit to perform the cleaning together with the traveling. When a cleaning command for a plurality of areas is inputted, the travel controller 230 may move to the area according to the setting of priority area or the specified order so that the cleaning can be performed. When a separate cleaning order is not specified, the travel controller 230 may move to, based on the current position, a near area or an adjacent area according to the distance and perform cleaning.

In addition, when a cleaning command for an arbitrary area is input regardless of the area division, the travel controller 230 may move to an area included in the arbitrary area and perform cleaning. When the virtual wall is set, the travel controller 230 may control the travel drive unit to avoid the virtual wall, based on the coordinate value input from the map generation unit 220.

Even if it is determined by the obstacle recognition unit 210 that the obstacle does not exist, the travel controller 230 may recognize that an obstacle exists at a corresponding position and restrict the traveling when the virtual wall is set. When the cleaning of the set specified area is completed, the controller 200 may store a cleaning record in the data unit.

In addition, the controller 200 may transmit the operation state or the cleaning state of the moving robot 1 to the terminal 300 through the communication unit 190 at certain intervals. Based on the data received from the moving robot 1, the terminal 300 may display the position of the moving robot together with the map on the screen of the application being executed, and also output information on the cleaning state.

The terminal 300 may display either the user map or the guide map on the screen according to the setting, and may change and display the map through the setting. The terminal 300 may display the received map on the screen, and may change the area by separating or merging the area through a key input or touch input, and may set the attribute of the area by changing or adding the attribute of the area. In addition, the terminal may specify a position on the map for a specific obstacle, and information on a specified obstacle may be transmitted to the moving robot and added to a pre-stored map.

The terminal 300 may specify a cleaning area corresponding to a key input or a touch input with respect to the displayed map, set a cleaning order, and transmit a cleaning command to the moving robot. In addition, the terminal 300 may display the cleaning state on the displayed map (user map and guide map), based on the data received from the moving robot. When information on an obstacle is added, the terminal may update and display the map based on the received data.

In addition, when a charging stand is detected through a return signal of the charging stand, the controller 200 may recognize the current position of the moving robot, and calculate and store the position of the charging stand based on the current position of the moving robot. The controller 200 may set the position of the charging stand to be displayed on the map.

Figure 6:
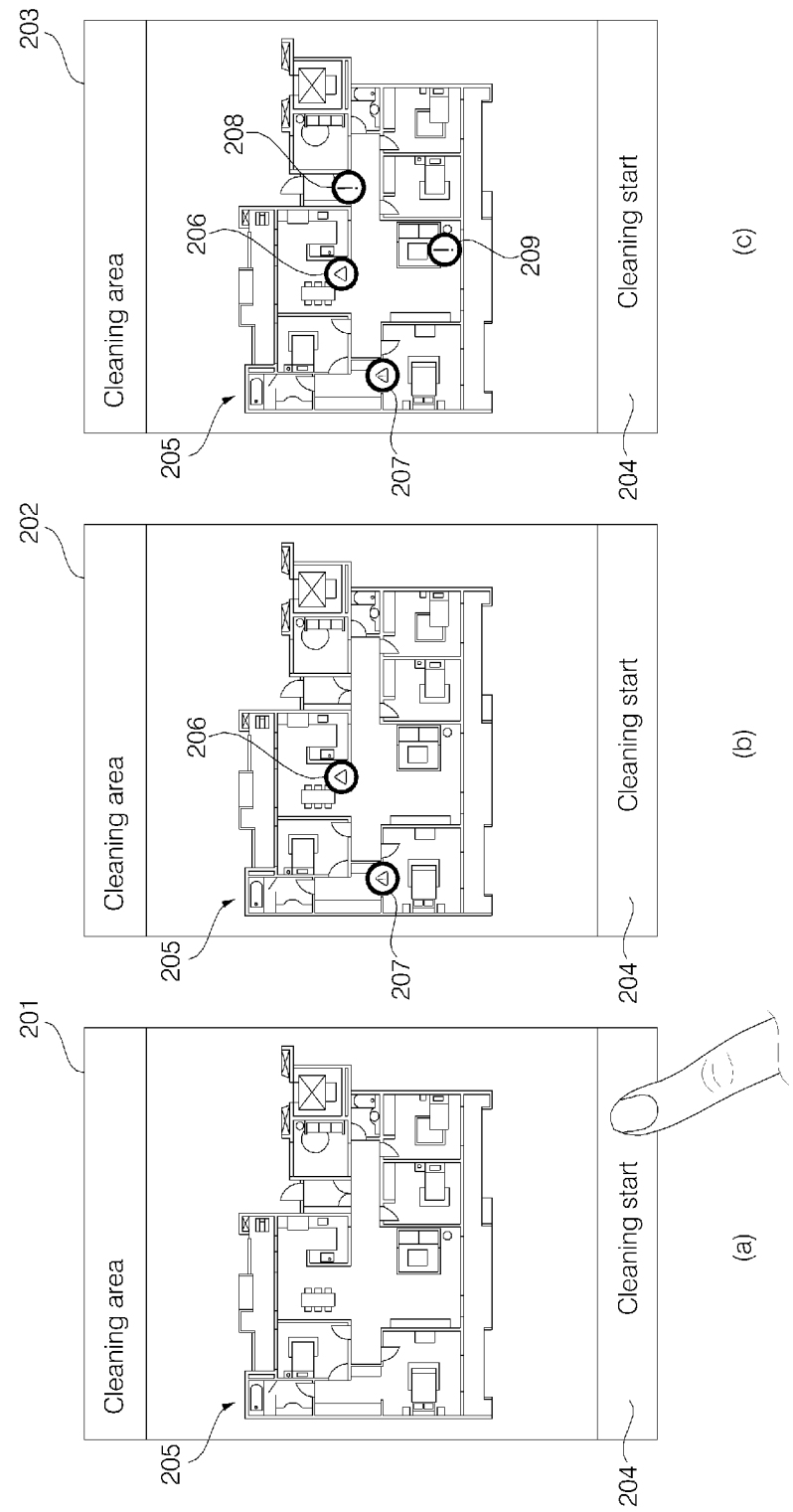
FIG. 6 is an exemplary view illustrating an isolation position of a moving robot system according to an embodiment of the present disclosure.

FIG. 6 is an exemplary view illustrating an isolation position of a moving robot system according to an embodiment of the present disclosure. When a map is not stored or an initial operation is performed, the moving robot 1 may travel in a cleaning area through a wall following or the like to generate a map. In addition, the moving robot 1 may perform cleaning for the cleaning area without a map, and may generate a map through acquired obstacle information.

The moving robot 1 may generate a cleaning map by dividing an area in the basic map, process the shape of the area of the cleaning map, and add a visual effect so that the user can easily recognize the cleaning area, thereby generating a user map. When the moving robot 1 travels in the cleaning area to generate a map, the moving robot 1 may transmit the generated map to the terminal 300.

The terminal 300 may display the user map or the cleaning map received from the moving robot 1 on a screen, and may also display the guide map formed in such a manner that the cleaning map is superimposed on the user map. The terminal 300 may display not only the map generated by the moving robot but also a floor plan for the cleaning area on the screen as a map.

As shown in section (a) of FIG. 6, the terminal 300 may execute an application or a program for controlling the moving robot 1, and display a control menu for setting a cleaning command on the screen.

A control menu 201 for inputting a cleaning command by specifying a cleaning area may include a map 205 for a cleaning area and a cleaning start key 204. Further, when an area to be cleaned is specified, the control menu may further include a setting key (not shown) for a detailed setting thereof such as a traveling mode, an operation for an obstacle, etc.

The terminal 300 may display a floor plan for the cleaning area according to the setting, and may display a map, such as a user map or a guide map, generated by the moving robot 1. The user map or the guide map may display an image, an icon, an emoticon, and the like of the obstacle according to the type of the obstacle.

The floor plan is illustrated so that user can easily determine the position, the room condition, the furniture arrangement, and the like for the cleaning area regardless of the travelable area of the moving robot 1. When a cleaning command is inputted based on the floor plan, the moving robot 1 may determine an area to be cleaned by matching the cleaning command with a provided map, and travel to perform cleaning.

When the moving robot 1 travels in a specified area and performs cleaning according to a cleaning command, the moving robot 1 may transmit data on a cleaning state and a cleaning progress state to the terminal 300 in a set cycle. The terminal 300 may display the cleaning state and the current position of the moving robot on the screen according to the data received from the moving robot 1. As shown in section (b) of FIG. 6, when an isolation state occurs during cleaning, the moving robot 1 may store data related to the isolation state and transmit data related to the isolation state to the terminal 300.

The terminal 300 may display a corresponding position on the map when the moving robot 1 is in the isolation state, according to the received data. The terminal 300 may display an isolation position 208 and 209 by matching the position where the isolation occurred with the map 205, based on position information of the moving robot 1. The isolation position may be an image, an icon, an emoticon, a number, a character, a special character, or a combination thereof for warning or danger.

The terminal 300 may display the isolation position on the map, output a certain notification sound or a warning sound corresponding thereto, and display a warning message. Accordingly, the user may check the isolation position displayed on the terminal and the isolation state of the moving robot 1.

At this time, the terminal 300 or the moving robot 1 may store the isolation position and automatically set a virtual wall in a corresponding position. When the moving robot 1 sets the virtual wall in the isolation position, the moving robot 1 may transmit data on the isolation position and the virtual wall setting to the terminal 300 so that the terminal 300 can check the virtual wall setting. The terminal 300 may output a comment on the isolation position and a guidance message, when the position where the moving robot 1 cannot move due to the isolation position is selected to be cleaned.

As shown in section (c) of FIG. 6, the moving robot 1 may set a predicted position for occurrence of isolation based on the data on the isolation position. The moving robot 1 may set the predicted position based on an environment similar to the surrounding environment of the isolation position, for example, the width of the passage through which a surrounding obstacle can be moved.

In addition, the moving robot 1 may transmit data on the isolation position to a server, and receive data on the predicted position through data analysis from the server. The server may analyze the cleaning area and the operation of the moving robot through the data of the moving robot.

The moving robot 1 may set a virtual wall in the predicted position according to the setting. The moving robot 1 may use the shape of a line, a point, a surface, and the like so as to restrict the travel to the isolation position and the predicted position, and the surface may be set in a polygonal, circular or free form (ex. heart, star).

The moving robot 1 may transmit data on the predicted position to the terminal 300. When the virtual wall is set, the moving robot 1 may transmit the data along with the data on the virtual wall.

The terminal 300 may display the predicted position 206 and 207 along with the isolation position 208 and 209 on the map. The terminal 300 may display the predicted position by an image, an icon, an emoticon, a number, a character, a special character, or a combination thereof.

The terminal 300 may differently display the isolation position in which the isolation occurred and the predicted position where isolation is likely to occur. For example, the terminal 300 may differently display the icons of the isolation position and the predicted position, or may display different colors or patterns to be displayed.

Figure 7:
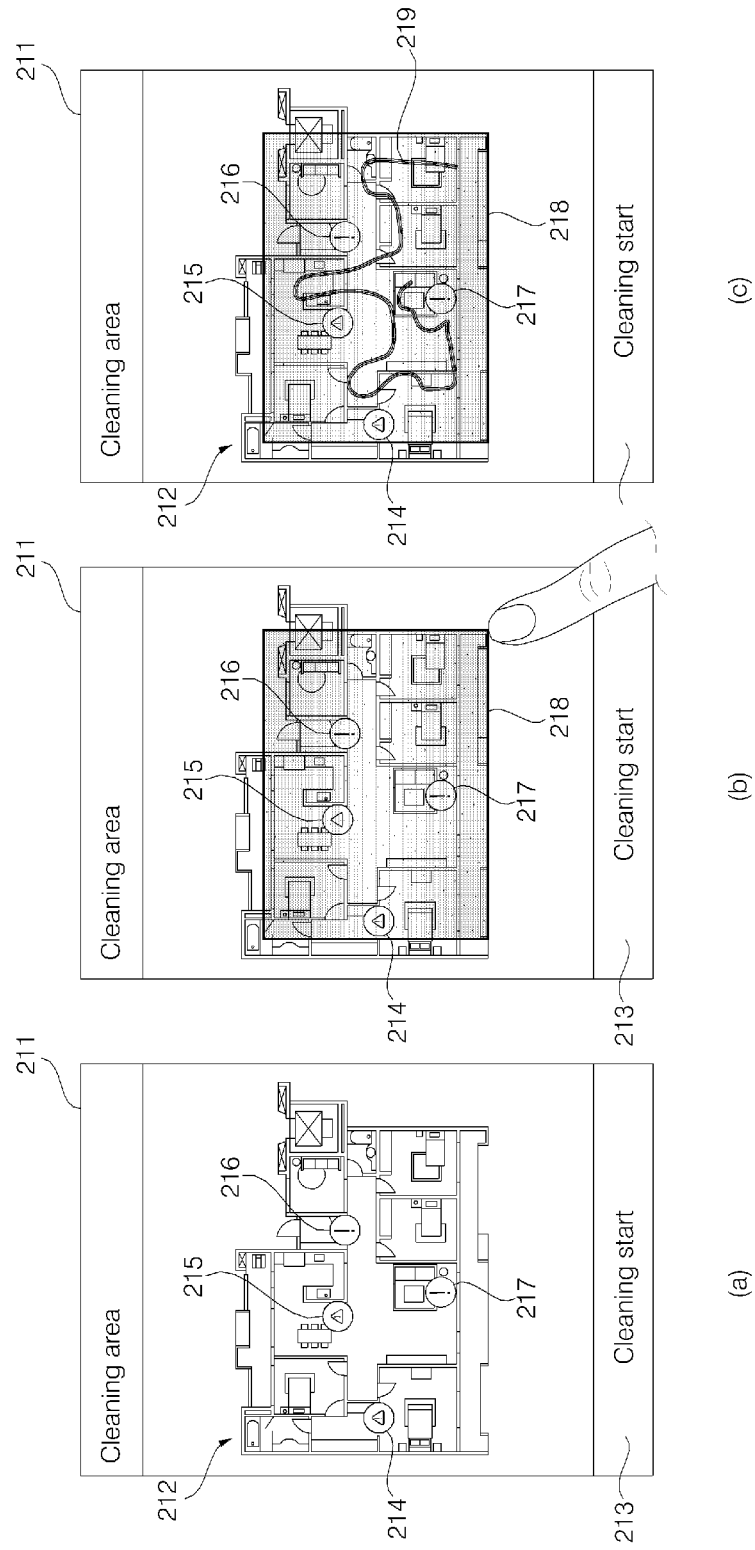
FIG. 7 is an exemplary view illustrating an isolation occurrence position and a corresponding predicted position of a moving robot system according to an embodiment of the present disclosure.

FIG. 7 is an exemplary view illustrating an isolation occurrence position and a corresponding predicted position of a moving robot system according to an embodiment of the present disclosure. As shown in section (a) of FIG. 7, the terminal 300 may display a control menu 211 for cleaning setting on the screen. On the control menu, a map 212 of an area to be cleaned may be displayed, and a plurality of keys for command input may be displayed.

The terminal 300 may set an area to be cleaned by the moving robot on the map 212 displayed in the control menu 211 in response to a key input or a touch input by a user. In addition, through the control menu, the terminal 300 may set the details of the cleaning, e.g., the order of cleaning, the priority, and, when detecting the obstacle, may set a corresponding operation, and the virtual wall.

When isolation occurred in the previously performed cleaning operation, the terminal 300 may display the isolation position 216 and 217 on the map 212 of the control menu 211, and also display the position where the probability of occurrence of isolation is high are indicated as the predicted position 214 and 215 based on the data on the isolation position. The predicted position may be set according to an area of similar type to the isolation position, and the position and structure of the surrounding obstacle, by analyzing the data on the isolation position and the data on the cleaning area. The predicted position may be set by any one of the moving robot 1, the terminal 300, and a server 9.

The terminal 300 may set the virtual wall in the isolation position 216 and 217 and the predicted positions 214 and 215. At this time, the virtual wall according to the isolation position and the predicted position may be set by the moving robot 1, corresponding data may be transmitted to the terminal, and set by the terminal and transmitted to the moving robot.

For example, in the case of the isolation position, the moving robot 1 may immediately set the virtual wall and transmit it to the terminal when the isolation occurs, and the terminal 300 may display the isolation position 216 and 217 on the screen. In addition, when the predicted position is calculated by the server based on the data on the isolation position, the terminal 300 may receive the data on the predicted position and set the virtual wall in the predicted position. The virtual wall for the predicted position 214 and 215 may be released according to the user's setting.

As shown in section (b) of FIG. 7, the terminal 300 may set an area to be cleaned on the map 212 in the control menu 211 in response to a key input or a touch input by the user. For example, when a certain area of the map is touched and dragged, the terminal 300 may set a rectangular selection area 218 having a diagonal line formed by a touch start point and a last dragged point, i.e., a point where drag is stopped, as an area to be cleaned.

In addition, the terminal 300 may set a circular area having a diameter formed by a touch start point and a dragged point, as an area to be cleaned, in response to the dragged position after the touch, and may set an area to be cleaned in a polygon or freeform according to the dragged position. When a plurality of points are touched, the terminal 300 may select each area on the map, i.e., an area divided into a room, a living room, and a kitchen, and set the selected area as a cleaning area.

As shown in section (c) of FIG. 7, when the selection area 218 is set as an area to be cleaned according to the user's input, the terminal 300 may generate a predicted path 219 avoiding the isolation position and the predicted position and display the predicted path 219 on the map. The terminal 300 may output a message confirming the cleaning of the predicted path 219. The terminal 300 may transmit a cleaning command to the moving robot 1, when a cleaning start key 213 is input or when a response to the cleaning is input by the user in response to the message.

As the virtual wall is set in the isolation position and the predicted position, the moving robot 1 may perform cleaning while not entering but avoiding the corresponding position. The moving robot 1 may determine the position of the virtual wall and avoid the virtual wall after approaching the virtual wall. Alternatively, the moving robot 1 may perform cleaning and avoid the virtual wall while keeping a specified distance without approaching the virtual wall within a specified distance.

Figure 8:
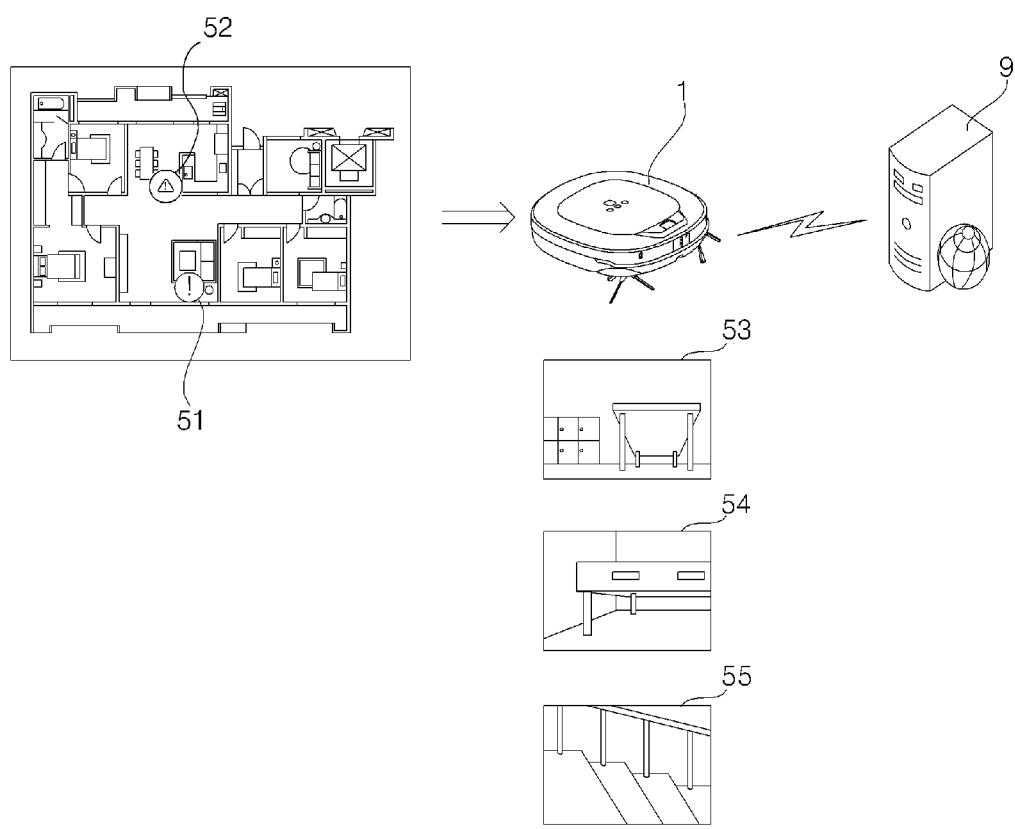
FIG. 8 is an exemplary view for explaining a surrounding environment of a cleaning area for an isolation position of a moving robot system according to an embodiment of the present disclosure.

FIG. 8 is an exemplary view for explaining a surrounding environment of a cleaning area for an isolation position of a moving robot system according to an embodiment of the present disclosure. As shown in FIG. 8, the terminal 300, the moving robot 1, and the server 9 may communicate with each other and share data.

When isolation occurs while the moving robot 1 performs cleaning according to a cleaning command, the moving robot 1 may communicate with the terminal 30 to transmit data on the isolation position. The data on the isolation position, hereinafter referred to as isolation position data, may be data on the position where the isolation occurred while the moving robot 1 is travelling, and may include information on the position of the mobile robot at the time when the isolation occurred, the shape and size of the surrounding area at the position where the isolation occurred, and the surrounding obstacle.

For example, the moving robot 1 may be isolated in a place such as under a chair, a table, a bed, or a chest of drawers, or in stairs. After the moving robot 1 enters under the chair, when the moving robot 1 collides with a chair leg and cannot escape, isolation may occur. When the escape fails even after attempting to escape a certain number of times, the moving robot 1 may determine that the isolation has occurred, store the escape position, and transmit data on the escape position.

When the moving robot 1 fails to escape, the moving robot 1 may output a certain warning sound so that user can recognize the isolation state. The terminal 300 may receive the data on the isolation position, display the isolation position 51 on the screen, and output a corresponding warning sound so that user can recognize the isolation state of the moving robot.

The moving robot 1 may store the data on the isolation position and transmit it to the terminal even when the moving robot 1 is temporarily isolated and succeed in the escape. When the isolation occurs, the moving robot 1 may photograph the surroundings through a provided image acquisition unit and transmit the current position of the moving robot and the photographed image as the isolation position data 53 to 55. The moving robot 1 may photograph a still image at a current position, and may photograph a moving image or a panoramic image by continuously rotating at a current position or repeatedly being stopped after rotating at a certain angle unit.

When the moving robot 1 transmits the isolation position data to the terminal, the terminal 300 may display the isolation position 51 on the screen in response to the received data. Further, the moving robot 1 may transmit data on the isolation position to the server 9. In some cases, when the moving robot 1 is not connected to the server, the terminal 300 may transmit the data on the isolation position received from the moving robot to the server 9.

Not only the server but also the moving robot 1 or the terminal 300 may independently analyze the data on the isolation position according to the stored data and calculate the predicted position where isolation is likely to occur. The predicted position may be set according to the area of the shape similar to the isolation position, the position and structure of the obstacle on the two sides, and the floor condition, by analyzing the data on the isolation position and the data on the cleaning area. When the moving robot 1 calculates the predicted position independently, the data on the calculated predicted position may also be transmitted to the terminal 300 and the server 9.

Hereinafter, the analysis by the server will be described as an example, and it is obvious that the analysis process and the process of calculating the predicted position can be performed in the same manner in the moving robot 1 or the terminal 300. The server 9 may analyze the isolation position data and calculate an predicted position where isolation can occur. The server may accumulate and store the isolation position data, analyze the shape, size and floor material of the isolated area, the position and size of the surrounding obstacle, and the size of the moving robot, and may set an area, from the cleaning area, that satisfies at least one of the same floor material, the same size area, and the structure of the obstacle, as the predicted position.

In addition, the server may set an area that is not entirely the same area but is the same area with a certain proportion, as the predicted position. The proportion of the sameness may be changed according to the setting. The server 9 may transmit data on the predicted position, hereinafter referred to as predicted position data, to the moving robot 1 or the terminal 300.

The server may accumulate and store the isolation position data or the data on the predicted position, analyze the stored data to calculate and store the predicted position through the analysis of the situation where the moving robot is isolated, and may transmit corresponding data to the connected moving robot 1. The server may accumulate and store data for a plurality of moving robots, and learn a non-travelable area of the moving robot based on the data of a plurality of moving robots.

The server may transmit the data on the predicted position to other moving robot cleaning the cleaning area of a similar environment to the moving robot. For example, since apartment buildings often have the same structure, other moving robot may encounter similar isolation, the data on the predicted position can be shared. The server 9 may also transmit the data on the predicted position calculated based on the isolation position data of other moving robot located in the cleaning area having a similar environment to the moving robot 1 to the moving robot or the terminal.

The moving robot 1 or the terminal 300 may set the virtual wall in a predicted position, based on the predicted position data. The terminal 300 may display a map of the cleaning area on the screen and display the isolation position 51 and the predicted position 52 on the map as an icon. The terminal 300 may transmit a cleaning command according to the user's input to the moving robot 1. The moving robot 1 may avoid the predicted position and the isolation position to travel in the cleaning area and perform cleaning.

Figure 9:
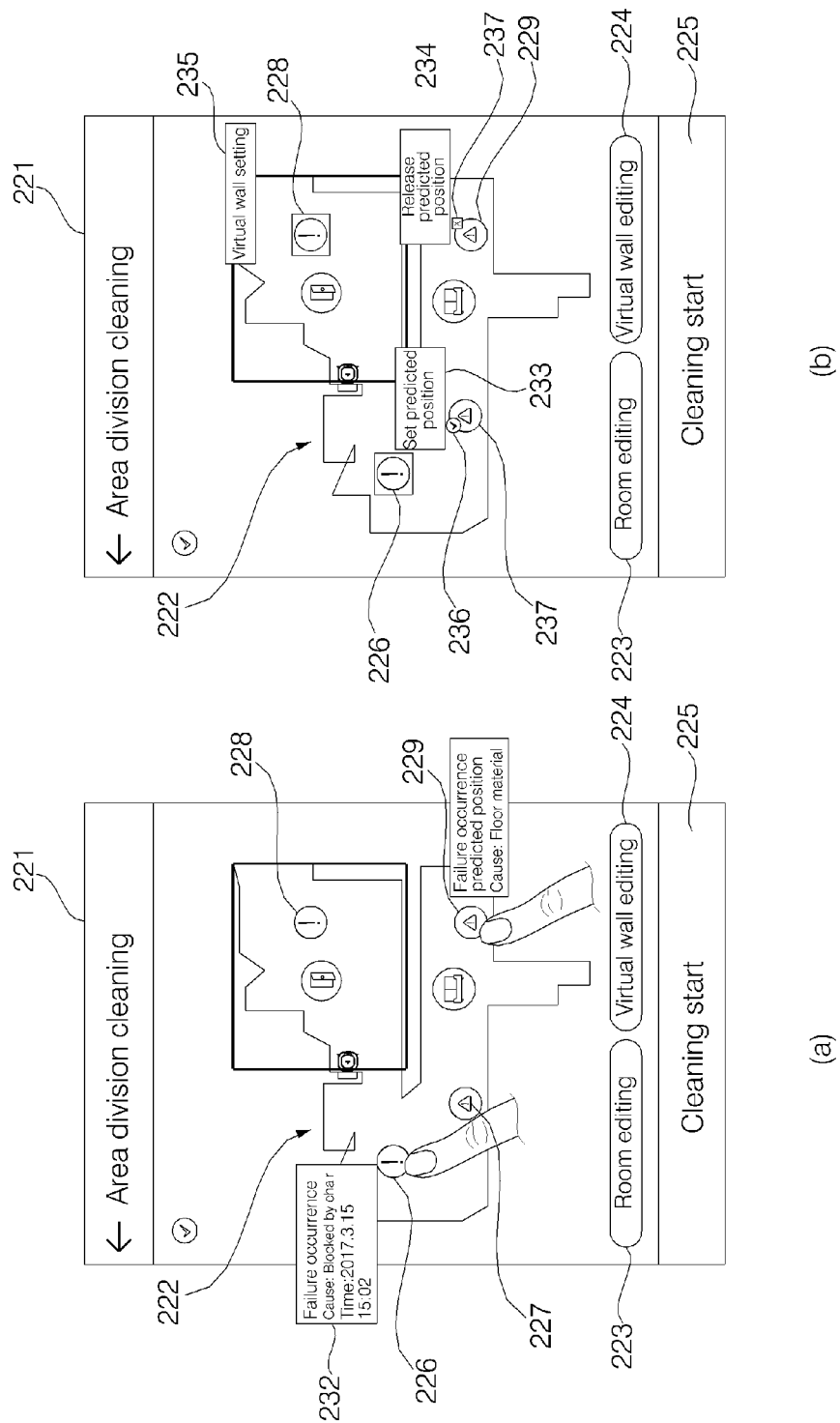
FIG. 9 is an exemplary view for explaining a method of displaying an isolation position and setting a virtual wall in a moving robot system according to an embodiment of the present disclosure.

FIG. 9 is an exemplary view for explaining a method of displaying an isolation position and setting a virtual wall in a moving robot system according to an embodiment of the present disclosure. As shown in section (a) of FIG. 9, on a control menu 221 for controlling the cleaning of the moving robot, which is displayed on the terminal 300, a map 222 for the cleaning area may be displayed, an area to be cleaned may be set in response to the input or touch input of a user, and a virtual wall may be set in the cleaning area or a setting for the cleaning operation may be inputted.

As described above, when the moving robot 1 travels according to the cleaning command and performs cleaning, if the isolation state occurs, the terminal 300 may display the isolation position (226, 228), (227, 229) on the map. In addition, the terminal 300 may display the position where isolation is likely to occur as the predicted position 227, 229.

When any one of the isolation position and predicted position icons displayed on the screen is selected, the terminal 300 may display detailed information 232 on the selected icon on the screen. The detailed information may be displayed in the form of a speech balloon or a pop-up window, and, in some cases, may be displayed in the top or bottom of the screen.

The detailed information 232 may include information on the isolation state of the moving robot 1 generated in a corresponding position. In the case of the isolation position, the time and cause of the occurrence of the isolation may be displayed. In the case of the predicted position, the cause of the possibility of the occurrence of isolation may be displayed.

For example, when the moving robot 1 enters under the chair and becomes isolated as it is trapped in the chair leg, if the icon of the isolation position is selected, detailed information indicating the time when the isolation occurred and indicating that the occurrence of the failure is caused by the trapping in the chair may be displayed.

When the icon of the predicted position is selected, the cause of the isolation may be displayed as the reason of expecting the occurrence of isolation. For example, when the moving robot is unable to travel due to the floor material, it may be displayed as a failure predicted area due to the floor material.

As shown in section (b) of FIG. 9, the terminal 300 may release the setting with respect to the isolation position or the predicted position. The terminal 300 may set or release the isolation position or the predicted position when the icon of the isolation position 226, 228 or the predicted position 227, 229 are touched for a certain time or longer (long key input). At this time, when the isolation position or the predicted position is released, the virtual wall in a corresponding position may also be released. At this time, the long key input according to the setting and the release may be just an example, and not only the long key input but also a degree of touch pressure, a double touch, and the like may enable to accomplish a desired function.

When the setting according to the isolation position or the predicted position is released, the icon of the isolation position or the predicted position may be inactivated. The icon in the isolation position or the predicted position may be displayed more blurry or achromatic than other icon, and icons may no longer be displayed in some cases.

When a long key input is generated as the inactivated icon is touched again for a certain time or longer, the terminal 300 may reset the isolation position or the predicted position corresponding to the icon, and set the virtual wall in a corresponding position. The terminal 300 may activate the icon for the isolation position or the predicted position to display the icon.

The setting or release of the isolation position or the predicted position may be displayed by a setting icon 236 and a release icon 237, and a corresponding setting information window 234 may be displayed. The setting information window 234 may be displayed in the form of a speech balloon or pop-up window, and, in some cases, may be displayed at the top or bottom of the screen. In addition, the setting information window 234 may display whether it is set to an isolation position or a predicted position or whether it is released. The terminal 300 may display all of the setting icon, the release icon, and the setting information window, or may display only one of them.

Figure 10:
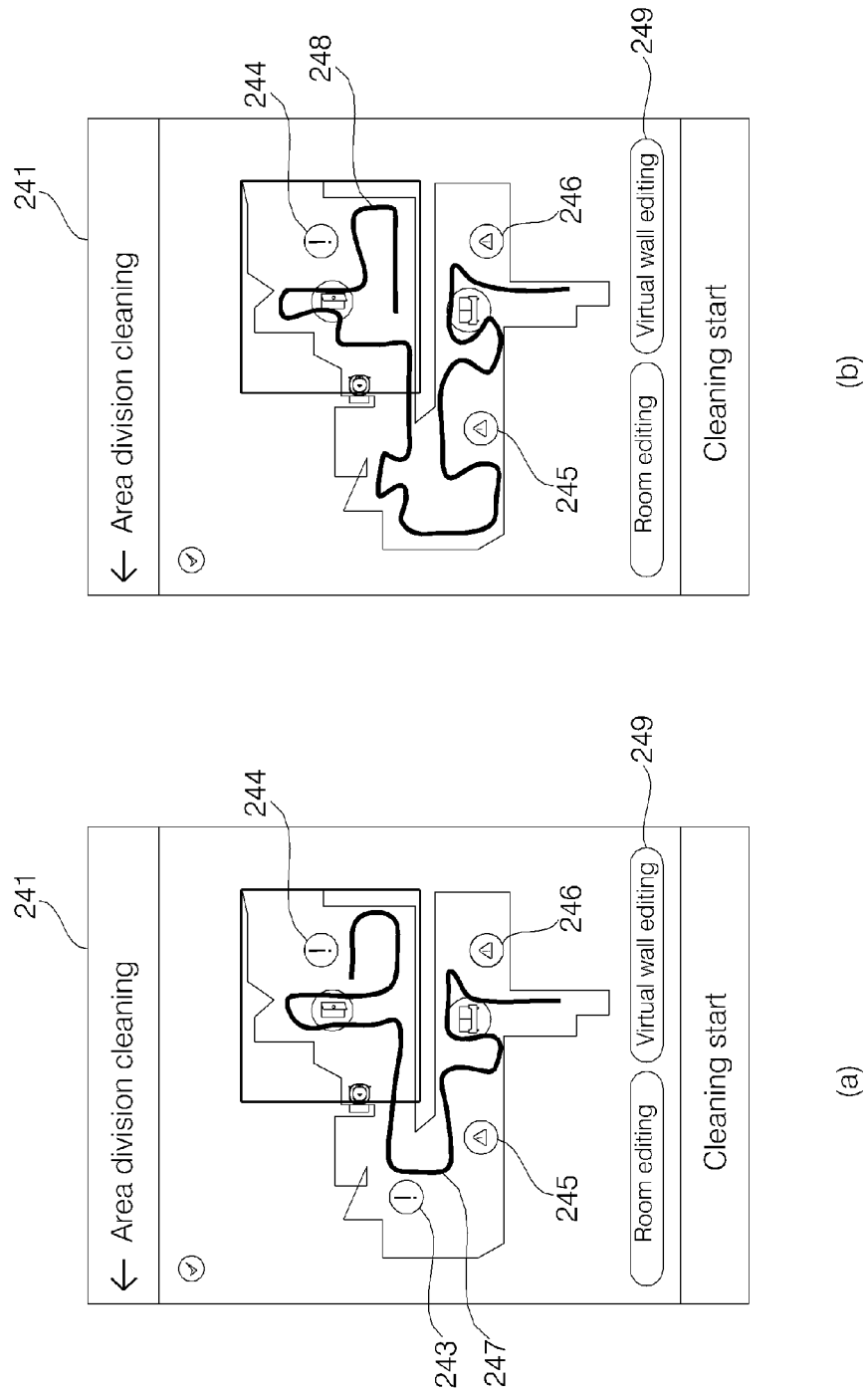
FIG. 10 is an exemplary view illustrating a movement path according to a virtual wall setting of a moving robot system according to an embodiment of the present disclosure.

FIG. 10 is an exemplary view illustrating a movement path according to a virtual wall setting of a moving robot system according to an embodiment of the present disclosure. As shown in section (a) of FIG. 10, the terminal 300 may calculate a movement path 247 of the moving robot 1 with respect to the area to be cleaned and display the movement path 247 on the screen, in a state where the isolation position 243, 244 and the predicted position 245, 246 are set. Since the virtual wall is set in a corresponding position when the isolation position and the predicted position are activated, the terminal may display a path through which the moving robot 1 travels while avoiding the isolation position and the predicted position. The terminal 300 does not display all the movement of the moving robot in the area to be cleaned but displays the movement path in the form of a line so that user can check the cleaning order and the moving direction.

Meanwhile, when either the isolation position or the predicted position is released as shown in section (b) of FIG. 9, the terminal 300 may release a specified virtual wall and recognize the virtual wall as a movable area. Accordingly, when one of the isolation positions is released, the terminal 300 can move to a corresponding position, so that a new movement path 248 can be calculated and displayed as shown in section (b) of FIG. 10.

Figure 11:
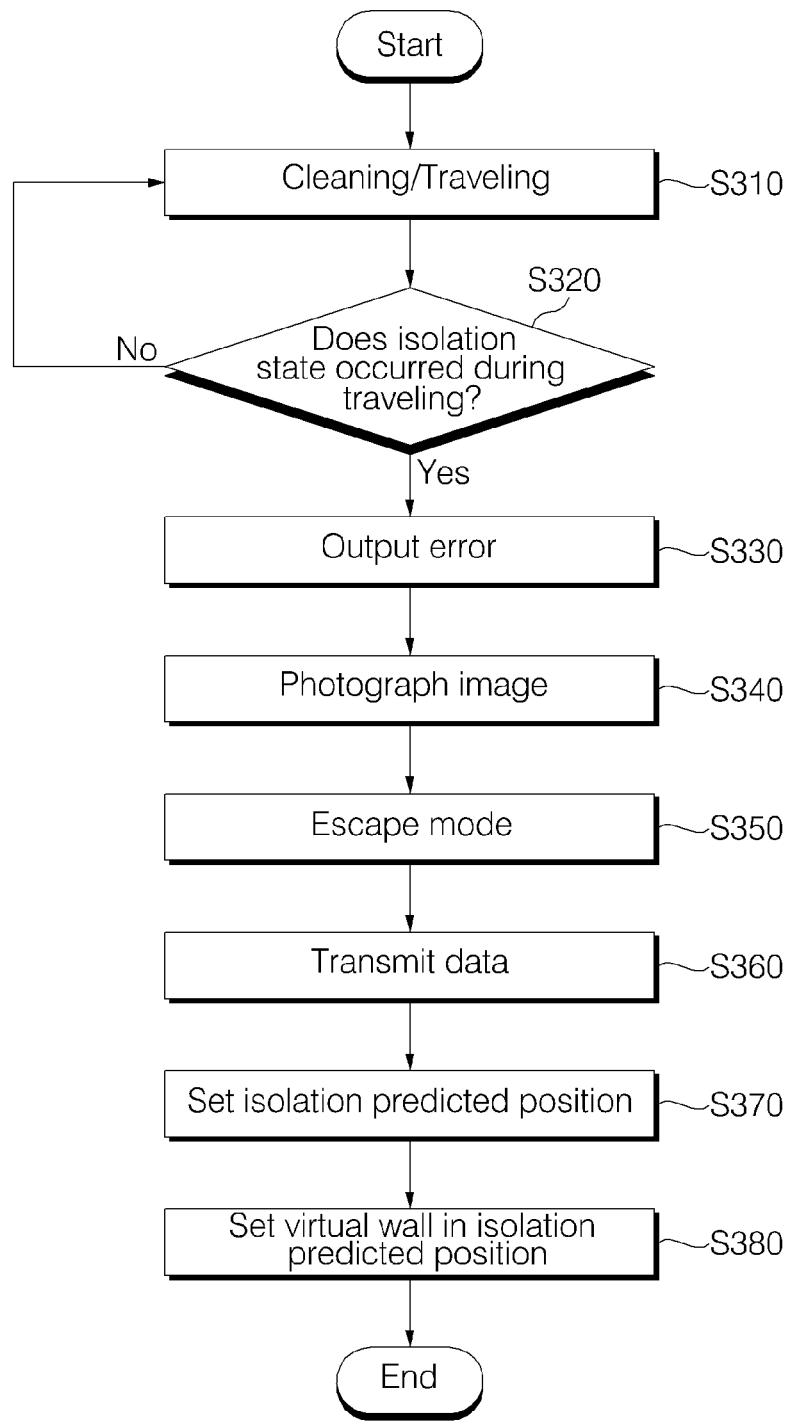
FIG. 11 is a flowchart illustrating a method of setting an isolation position of a moving robot system according to an embodiment of the present disclosure.

FIG. 11 is a flowchart illustrating a method of setting an isolation position of a moving robot system according to an embodiment of the present disclosure. As shown in FIG. 11, the moving robot 1 may perform cleaning while traveling in a specified area according to the setting (S310).

When the moving robot 1 is unable to move during traveling after entering a certain area, the moving robot 1 may determine this state as an isolation state (S320). For example, the moving robot 1 may enter under a chair, under a table, or a narrow space so as to perform cleaning, and may be blocked by a surrounding obstacle such as a chair leg to be unable to travel to the next area. The moving robot 1 may attempt to move a certain number of times. When the moving robot 1 cannot escape from the isolation state, it may determine this state as an isolation state and output an error (S330).

When it is determined that the moving robot 1 is in an isolation state, the moving robot 1 may output a certain warning sound so that user can recognize the isolation state of the moving robot 1. The moving robot 1 may determine the current position and photograph an image of the surroundings through the image acquisition unit (S340).

The moving robot 1 may photograph, in a still state, a still image, and may photograph a still image of the surrounding environment of the moving robot 1 several times while repeating the rotation and stopping in a unit of a certain angle. In addition, the moving robot 1 may photograph a moving image or a panoramic image while rotating 360 degrees continuously at the same spot.

After determining that the moving robot 1 is in an isolation state, the moving robot 1 may set an escape mode and attempt to escape (S350). The moving robot 1 may set a corresponding position to the isolation position even if the escape is successful, and set a virtual wall so as not to approach the position when next traveling. The moving robot 1 may attempt to escape from the isolation state more than a certain number of times, and even if the escape is successful, the moving robot 1 may determine that the corresponding position is the isolation position and store isolation position data.

The moving robot 1 may transmit the isolation position data containing a photographed image and information on current position to the terminal 300 (S360). Further, the moving robot 1 may transmit the isolation position data to a server. The isolation position data may also contain information on a virtual wall set in the isolation position. The terminal 300 may display an icon for the isolation position in one area of the map by matching the displayed map with the isolation position of the moving robot, in response to the received isolation position data.

In addition, the server may analyze the isolation position data independently and calculate a point where the isolation is likely to occur in the cleaning area as the predicted position. At this time, the analysis of the isolation position data and the calculation of the predicted position may be performed also in the moving robot 1 or the terminal.

Based on the analysis result, the server may set an isolation predicted position with respect to an area of an environment similar to the isolation position among the cleaning area where the moving robot travels. In addition, the server may analyze the past travel data and the isolation position data of the moving robot, and set an predicted position with respect to an area where isolation is likely to occur depending on the floor material, the shape of surrounding obstacle, and the position of obstacle in the cleaning area. In addition, the server may compare and analyze data of other moving robot having a similar cleaning area so that a predicted position where isolation shall occur can be additionally set. The server may transmit the predicted position data to the moving robot 1 or the terminal 300.

The moving robot 1 or the terminal 300 may set a predicted position where isolation is likely to occur (S370), according to the received predicted position data, and set a virtual wall in the predicted position (S380). The terminal 300 may display a predicted position on the map according to the received predicted position data. The terminal 300 may display the isolation position and the predicted position differently, and set or release the isolation position or the predicted position in response to the key input or touch input. When the isolation position or the predicted position is released, the virtual wall set in a corresponding position may be also released.

Figure 12:
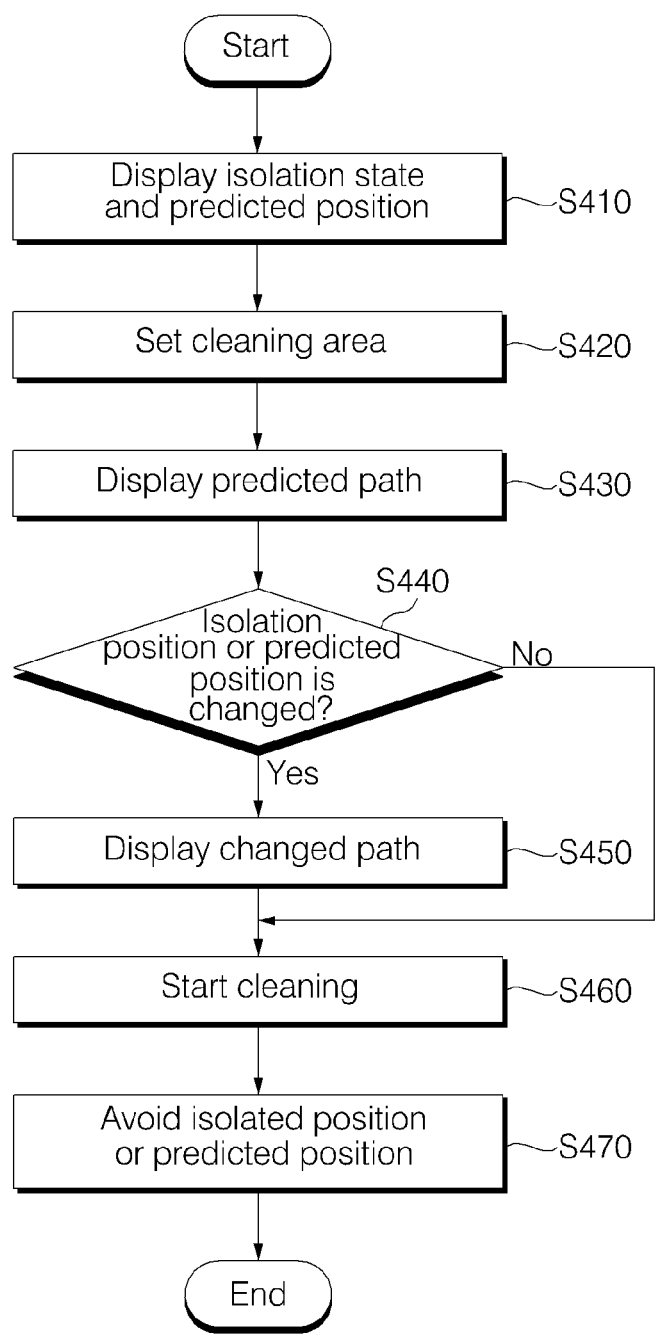
FIG. 12 is a flowchart illustrating a method of setting a virtual wall depending on an isolation position of a moving robot system according to an embodiment of the present disclosure.

FIG. 12 is a flowchart illustrating a method of setting a virtual wall depending on an isolation position of a moving robot system according to an embodiment of the present disclosure. As shown in FIG. 12, the terminal 300 may display the control menu for cleaning setting of the moving robot on the screen.

Based on the pre-stored data, the terminal 300 may display the isolation state of the moving robot 1 and the predicted position which is calculated according to the isolation state on the screen (S410). When the isolation is occurred in the past during the cleaning operation of the moving robot, corresponding isolation position and estimated predicted position may be displayed.

In the control menu, in the case of new cleaning, when a certain area is selected (tapped) on the map, or when an area of a certain size is selected by dragging after touching the area, the terminal 300 may set the selected area to an area to be cleaned (S420). In addition, the operation of the moving robot 1 during cleaning may be set.

The terminal 300 may calculate a predicted path in consideration of the isolation position, the predicted position, and the position of the obstacle within a range of the selected area, and display the predicted path on the map (S430). The predicted path does not display a detailed position but is intended to indicate the travel direction of the moving robot. When either the isolation position or the predicted position displayed on the map is changed (S440), for example, when the isolation position or the predicted position is newly set or released, the terminal 300 may calculate and display a new predicted path as the travelable area is changed (S450).

When a cleaning start key is input, the terminal 300 may transmit data on the cleaning area and the setting to the moving robot 1 to transmit a cleaning command. Accordingly, the moving robot 1 may perform cleaning for a specified area (S460). When an obstacle or a virtual wall is detected during traveling, particularly, a virtual wall according to the isolated position or a predicted position is detected, the moving robot 1 may avoid the virtual wall and move to the next area (S470). Accordingly, when the moving robot is in a state in which the moving robot cannot escape from a specific position, the present disclosure may determine that the moving robot is in an isolation state, and store information on the position of isolation, the position, size and arrangement structure of the surrounding obstacle, and the height and material of the obstacle.

The server may analyze the isolation position data to predict an area that has not been isolated yet but is determined that isolation can be occurred, and set the predicted area as a predicted position, thereby preventing the operation stopping of the moving robot 1 due to the isolation. The server may analyze the data of other moving robot as well as the data of the moving robot, accumulate data on the situation of the occurrence of the isolation, and set a similar type of area to the predicted position when the similar type of area is included, thereby learning about the non-traveling or non-cleaning area. Accordingly, the movement to a corresponding area may be restricted through the isolation position or the predicted position so that the damage to the moving robot can be prevented and the cleaning can be more effectively performed.

The present application provides a moving robot system which restricts traveling of a moving robot by setting a virtual wall in an area where isolation shall occur so that the moving robot is not isolated within a cleaning area, and a control method thereof. In accordance with an aspect of the present disclosure, a moving robot system may include: a moving robot which travels in a cleaning area, generates a map of the cleaning area, moves based on the map, and sucks foreign substances; and a terminal which inputs a cleaning command to the moving robot, based on the map, wherein the moving robot determines that the moving robot is in an isolation state, when the moving robot is unable to move due to a surrounding obstacle while traveling in the cleaning area, and sets a virtual wall in an isolation position where isolation is occurred and avoids the isolation position during a next cleaning operation.

In accordance with another aspect of the present disclosure, a method of controlling a moving robot system includes: traveling in a cleaning area and generating a map for the cleaning area, by a moving robot; determining that the moving robot is in an isolation state when the moving robot is unable to move in a first area, during the traveling of the moving robot; generating isolation position data including information on an isolation position and a surrounding area, when it is determined that the moving robot is in the isolation state; and transmitting the isolation position data to a terminal or a server.

The moving robot system and the control method of the same according to present disclosure collect data on the surrounding area in the isolation state where the moving robot can no longer travel during traveling of the moving robot, set the moving robot so as not to enter the isolation position in the next cleaning, analyze the data on the isolation position and learn the area where the moving robot cannot travel in, thereby setting the position where the isolation is likely to occur to the predicted position and restricting the movement of the moving robot.

A virtual wall is automatically set in a position where isolation is occurred and the predicted position where isolation is likely to occur so that the moving robot can be prevented from being unable to travel in, and can move the travelable area to perform cleaning more effectively. In addition, by editing the isolation position and the predicted position through the terminal, unnecessary restriction can be released, thereby preventing damage to the moving robot and performing cleaning more effectively.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system comprising:
a robot that travels in and performs a function within an area, the robot including a controller that generates a map of the area and manages a movement of the robot based on the map;
a terminal that provides a command to the robot based on the map; and
a server that analyzes the area and an operation of the robot through data of the robot,
wherein the controller of the robot further:
determines when the robot is in an isolation state in which the robot is unable to move from a region due to an obstacle while traveling in the area,
transmits isolation position data including information on the isolation position and a surrounding area to at least one of the terminal or the server,
sets virtual walls at an isolation position associated with a location of the robot where the isolation state occurs and at a predicted position where the robot would be in the isolated state, and
avoids the isolation position and the predicted position during another travel operation based on setting the virtual walls,
wherein the server determines the predicted position in the area where the robot would be in the isolated state, and
wherein the terminal displays the isolation position and the predicted position with the map, sets an area to perform the function by setting or releasing the isolation position and the predicted position in response to receiving a user input, and calculates a predicted path avoiding at least one of the isolation position or the predicted position.

2. The system of claim 1, wherein the robot further includes a communication interface that transmits isolation position data including information on the isolation position and a surrounding area to at least one of the terminal or the server.

3. The system of claim 2, wherein the controller of the robot further determines at least one of a position of the obstacle, a height of the obstacle, or a floor material of the surrounding area when the robot is in the isolation state, and includes information about the determined at least one of the position, the height, or the floor material in the isolation position data.

4. The system of claim 3, wherein the robot includes a camera and captures a plurality of still images by repeatedly being stopped after rotating at a certain angle, or captures a moving image or a panoramic image by performing a continuous rotation at a current position the robot is determined to be in the isolation state, and stores the captured still images, moving image, or panoramic image.

5. The system of claim 1,
wherein the server further analyzes isolation position data that includes information on the isolation position and a surrounding area and determines a predicted position of the and transmits the predicted position to the robot or the terminal.

6. The system of claim 5, wherein the server
accumulates and stores the isolation position data, and
analyzes at least one of a shape, a size, or a floor material of an area where the isolation position occurs, a position and a size of surrounding obstacle, and a size of the robot so that an area, in the area, that satisfies at least one of a same floor material, a same size area, or a structure of obstacle is set as the predicted position.

7. The system of claim 5, wherein the server
accumulates and stores data of a plurality of robots, and
identifies an isolation occurrence position of the robot, based on the data of the plurality of robots.

8. The system of claim 5, wherein the terminal visually distinguishes the isolation position and the predicted position in a display using at least one of respective different shapes, colors, or patterns.

9. The system of claim 8, wherein the terminal displays a time and a cause of the isolation state at the isolation position when the isolation position is selected from the map, and displays an expected cause for the isolation state when the predicted position is selected.

10. The system of claim 9, wherein, when at least one of the isolated position or the predicted position is released, the terminal displays an icon associated with the released one of the isolated position or the predicted position and releases the set virtual wall, determines that the released position is a travelable area, determines and displays a new predicted path and, when the deactivated icon is selected, resets the one of the isolated position or the predicted position corresponding to the icon.

11. The system of claim 1, wherein the function performed by the robot is a cleaning function.

12. A method comprising:
traveling in an area and generating a map for the area, by a robot;
determining that the robot is in an isolation state in which the robot is unable to move from an isolation position due to an obstacle, during the traveling of the robot;
generating isolation position data including information on the isolation position and a surrounding area;
transmitting the isolation position data to at least one of a terminal or a server;
determining, by the server, a predicted position in the area at which the robot may enter the isolated state;
setting virtual walls at the isolation position and the predicted position where the robot would be in the isolated state, as received from the server;
traveling and avoiding the isolation position and the predicted position during another travel operation;
displaying the isolation position and displaying the predicted position within the map, by the terminal;
calculating, by the terminal, a predicted path that avoids the isolation position and the predicted position; and
displaying, by the terminal, the predicted path on the map for region set based on a user input.

13. The method of claim 12, wherein generating the isolation position data further includes:
determining, by the robot, at least one of a position of the obstacle, a height of the obstacle, or a floor material of the surrounding area, when the robot is in the isolation state.

14. The method of claim 12, wherein generating the isolation position data further includes:
capturing at least one of a still image, a moving image, and a panoramic image when the robot is in the isolation state.

15. The method of claim 12, further comprising:
analyzing, by the server, the isolation position data received from the robot; and
transmitting, by the server, data on the predicted position to at least one of the robot or the terminal.

16. The method of claim 15, further comprising:
accumulating and storing the isolation position data, by the server,
wherein determining the predicted position includes:
analyzing a shape, a size, and a floor material of an area where the isolation state occurs, a position and a size of surrounding obstacle, and a size of the robot so that an area, in the area, that satisfies at least one of a same floor material, a same size area, and a structure of obstacle is set as a predicted position.

17. The method of claim 12, further comprising:
accumulating and storing data of a plurality of robots, by the server; and
learning a non-travelable area for the robot, based on the data of the plurality of robots.

18. The method of claim 12, further comprising:
displaying a time and a cause of occurrence of the isolation state associated with the isolation position when the isolation position is selected; and
displaying a cause of the isolation state associated with the predicted position when the predicted position is selected.

19. The method of claim 12, further comprising:
setting or releasing, by the terminal, at least one of the isolation position or the predicted position in response to a user input;
releasing a virtual wall which is set in at least one of the isolation position or the predicted position, when the at least one of one of the isolation position or the predicted position is released; and
determining, as a travelable area, a new predicted path, and displaying the new predicted path.

20. The method of claim 12, wherein the robot performs a cleaning function.

* * * * *